US005555413A

United States Patent [19]
Lohman et al.

[11] Patent Number: 5,555,413
[45] Date of Patent: Sep. 10, 1996

[54] COMPUTER SYSTEM AND METHOD WITH INTEGRATED LEVEL AND EDGE INTERRUPT REQUESTS AT THE SAME INTERRUPT PRIORITY

[75] Inventors: Terence Lohman, Boca Raton, Fla.; Mark G. Noll, Raleigh, N.C.; Jose A. Olive, Miami; Roberto V. Perez, Boca Raton, both of Fla.

[73] Assignee: International Business Machines Corporation, Armonk, N.Y.

[21] Appl. No.: 390,610

[22] Filed: Feb. 17, 1995

[51] Int. Cl.[6] .................................................... G06F 9/46
[52] U.S. Cl. ............................................ 395/733; 395/868
[58] Field of Search ................................. 395/734, 736, 395/739, 733, 868

[56] References Cited

U.S. PATENT DOCUMENTS

| | | | |
|---|---|---|---|
| 4,023,143 | 5/1977 | Braunstein | 395/736 |
| 4,764,864 | 8/1988 | Takane | 395/736 |
| 5,261,107 | 11/1993 | Klim et al. | 395/739 |
| 5,381,541 | 1/1995 | Begun et al. | 395/500 |
| 5,410,710 | 4/1995 | Sarangdhar et al. | 395/739 |
| 5,438,677 | 8/1995 | Adams et al. | 395/736 |

Primary Examiner—Jack B. Harvey
Assistant Examiner—Glenn A. Auve
Attorney, Agent, or Firm—Daniel E. McConnell; Robert S. Babayi

[57] ABSTRACT

A computer system that has a processor that services interrupts in response to receipt of a signal at the interrupt request has a first device and a second device coupled to the processor. The first device is capable of transmitting a first interrupt request signal that includes an edge transition. The second device is capable of transmitting a second interrupt request signal that comprises a level assertion. An interrupt handler is coupled to the processor and the first and second devices, the interrupt handler receiving the first and second interrupt request signals as inputs and providing the first and second interrupt request signals as outputs to the processor in a sequence according to a predetermined criteria, the first and second interrupt request signals having identical priority.

33 Claims, 11 Drawing Sheets

COMPUTER SYSTEM AND METHOD WITH INTEGRATED LEVEL AND EDGE INTERRUPT REQUESTS AT THE SAME INTERRUPT PRIORITY

BACKGROUND OF THE INVENTION

1. Technical Field of the Invention

This invention generally relates to an interrupt handler for a computer system and, more particularly, to an interrupt handler coupled to a plurality of interrupt sources, this plurality of interrupt sources including interrupt sources that generate edge-triggered interrupt request signals received by the interrupt handler as well as interrupt sources that generate level-triggered interrupt request signals also received by the interrupt handler.

2. Description of Related Art

Many computer systems are designed to interface with one or more peripheral devices. A computer system typically includes a central processing unit (CPU) connected to a system bus having data, address, and control lines. The bus is connected to other computer system components, such as program memory, and also to peripheral devices via a suitable interface. The interface may include interface devices for translating voltages or signal formats for compatibility between the computer system and the peripheral devices. Suitable interface connectors are often employed. Communication between the CPU and the peripheral devices can include sensory or command information. Specifically, a peripheral device acting as a sensor may produce data signals indicative of parameters the peripheral sensing device is sensing, such as temperature, voltage, or other parameters. The data signals may be translated to a suitable form and read through the interface by the CPU to provide the CPU with needed data regarding the sensed parameters. Alternatively, the peripheral devices may be controllers. The CPU commands a peripheral controlling device by writing suitable commands through the interface to the peripheral controlling device. The device then takes suitable action in accordance with the command.

In a system including a plurality of peripheral devices, frequent or continuing communication between the CPU and the peripheral devices is often necessary. Various schemes have been used for keeping the CPU in touch with the peripheral devices. A first scheme is called polling. In a polling system, the CPU executes a polling routine at intervals of time. Typically, a hardware timer will cause the CPU to execute the polling routine periodically. During the polling routine, the CPU reads information from the peripheral devices indicating whether the status of a sensed parameter has changed or whether there is a need to send a command to the peripheral device. Depending on the information received from a given peripheral device during the polling routine, the CPU takes appropriate action, such as sending commands to the peripheral device or updating a record of the status of the peripheral device stored in computer system memory. Polling is commonly used in computer systems which interface with a large number of peripheral devices. However, polling has the disadvantage that the polling routine must be executed frequently, thereby consuming a large amount of CPU processing time. In many instances, the status information read from the peripheral devices indicates that no action is necessary. Thus, the time spent executing the polling routine in retrospect proves to be unproductive. In computer system involving a great deal of activity or real-time applications, the time spent repeating the polling routine can reduce processing efficiency.

As an alternative to polling, computer systems often service peripheral devices by means of interrupts. In an interrupt system, a peripheral device sends a signal called an interrupt request when a condition is detected requiring some type of action by the CPU. Many CPUs are designed to include interrupt request input lines. A CPU having such an interrupt request input responds to a predetermined voltage signal on the interrupt request line by executing an interrupt service routine. Thus, an interface between a CPU and a peripheral device can include circuitry which detects a change of status in the peripheral device for which service is required and provides a suitable interrupt request signal to the CPU.

An interrupt driven system of this type provides improved processing efficiency since interrupt routines are executed only when required. However, frequently a CPU will be employed to service a plurality of peripheral devices. In such a system, questions arise as to how to go about determining which peripheral device needs to be serviced in response to an interrupt request. Also, if several peripheral devices simultaneously provide interrupt request signals, there must be a way of determining which one is serviced first. In order to provide practical answers to these questions, programmable interrupt controllers have been designed and utilized in conjunction with computer systems. An interrupt controller typically has a single interrupt request output which is connected to the interrupt request input of the CPU. The interrupt controller also has a plurality of interrupt request inputs. Each interrupt request input is connected to a peripheral device. Thus, when the peripheral device requires servicing, it produces a suitable interrupt request signal which is received by the interrupt controller. The interrupt controller then interrupts the CPU and causes a suitable interrupt service routine to be executed.

A well-known example of an interrupt controller the 8259A programmable interrupt controller manufactured by Intel Corporation. The 8259A is designed to operate with two different types of microprocessors which support multiple interrupt request inputs in two different ways. The first type is exemplified by the Intel 8080/8085 microprocessors which service interrupt requests by executing a software sub-routine call instruction which has as an operand the address of the subroutine. The second type is exemplified by the Intel 8086 microprocessor which services interrupt requests by using an 8-bit vector to select an interrupt service routine address from a table of addresses stored in a contiguous area of memory. Depending on which type of microprocessor the 8259A is programmed for, in response to an interrupt request input, the 8259A will interrupt the CPU and provide either a subroutine call instruction followed by an interrupt service routine address or an eight bit interrupt vector over the system bus to the CPU. Thus, in either case, the 8259A provides the CPU with information as to which interrupt service routine to execute, thereby ensuring that the CPU services the peripheral device which requested the interrupt in a suitable manner.

The 8259A may be configured to detect interrupt requests on its interrupt request inputs as either low-to-high voltage transitions or as high voltage levels. In other words, the 8259A interrupt request inputs can be configured as either edge-triggered or level-triggered. Many peripheral devices have been designed to produce edge-triggered interrupt request signals in the form of low-to-high voltage transitions. Specifically, an edge-triggered interrupt request is a transition from a recognizably low voltage to a recognizably high voltage within a predetermined time limit. Peripheral devices which request service by means of high voltage levels are becoming more common.

However, programmable interrupt controllers to date have had the drawback that all interrupt request inputs are configured in the same manner. Typically, a single edge/level configuration control bit is used to program all interrupt request inputs to be either edge-triggered or level-triggered. This drawback has resulted in the disadvantage that upgrading a system to include peripheral devices producing level-triggered interrupt requests has required that all peripheral devices be so updated. It is not practical to employ a mix of level-triggered peripheral devices and older edge-triggered peripheral devices. Decreased flexibility and increased user costs have resulted.

In traditional arrangements, interrupt applications have permitted only level-triggered devices to have the same (identical) priority. Attempts have been made to integrate level-triggered request signals and edge-triggered request signals, but these have often involved assigning different priorities to level-triggered sources and to edge-triggered sources. These attempts often included statically multiplexing the sources of the level-triggered request signals and the edge-triggered request signals. In other efforts, the sources of the edge-triggered request signals were detached (or "degated") when a source of the level-triggered request signal activated. These methods share the problem of risking the loss of possible requests sent by the detached source.

SUMMARY OF THE INVENTION

There is a need for a system which can accommodate interrupts from both edge-triggered interrupt sources and level-triggered interrupt sources without risking the loss of possible requests from any of the sources.

This and other needs are met by the present invention which provides a computer system comprising a processor having an interrupt request input, the processor servicing interrupts in response to receipt of a signal at the interrupt request. A first device is coupled to the processor, this first device being capable of transmitting a first interrupt request signal that comprises an edge transition. A second device is coupled to the processor, the second device being capable of transmitting a second interrupt request signal that comprises a level assertion. An interrupt handler is coupled to the processor and the first and second devices, the interrupt handler receiving the first and second interrupt request signals as inputs and providing the first and second interrupt request signals as outputs to the processor in a sequence according to a predetermined criteria, the first and second interrupt request signals having identical priority.

An advantage of the present invention is that the interrupt handler provides the first and second interrupt request signals to the processor in a certain sequence, even though these signals have the same priority. Thus, since the different types of devices are not detached due to the identical priority given to the different types of request signals, there is no risk of possible loss of a request.

Another embodiment of the present invention provides an interrupt handler with a first input for receiving interrupt signals of a first type comprising edge transitions, a second input for receiving interrupt request signals of a second type, the second type comprising level assertions, the first type and the second type of interrupt request signals having identical priorities, and a circuit coupled to the first and second inputs and having an output, the circuit sequentially providing the interrupt request signals of the first and second type at the output according to predetermined criteria.

In certain embodiments of the invention, the predetermined criteria is programmable, providing great flexibility to a system designer.

The earlier stated needs are also met by an embodiment of the present invention which provides a method of handling interrupt requests to a processor from a plurality of sources, the method comprising the steps of receiving in an interrupt handler a first interrupt request signal from at least one of the sources, the first interrupt request signal being an edge triggered request signal. A second interrupt request signal is received in the interrupt handler from at least another one of the sources, the second interrupt request signal being a level triggered request signal, the first and second interrupt request signals having identical priority. The first and second interrupt request signals are then provided as output from the interrupt handler to a processor in a sequence according to a predetermined criteria.

The foregoing and other objects, features, aspects and advantages of the present invention will become more apparent from the following detailed description of the present invention when taken in conjunction with the accompanying drawings.

DESCRIPTION OF THE ILLUSTRATIVE EMBODIMENTS

Figure 1:
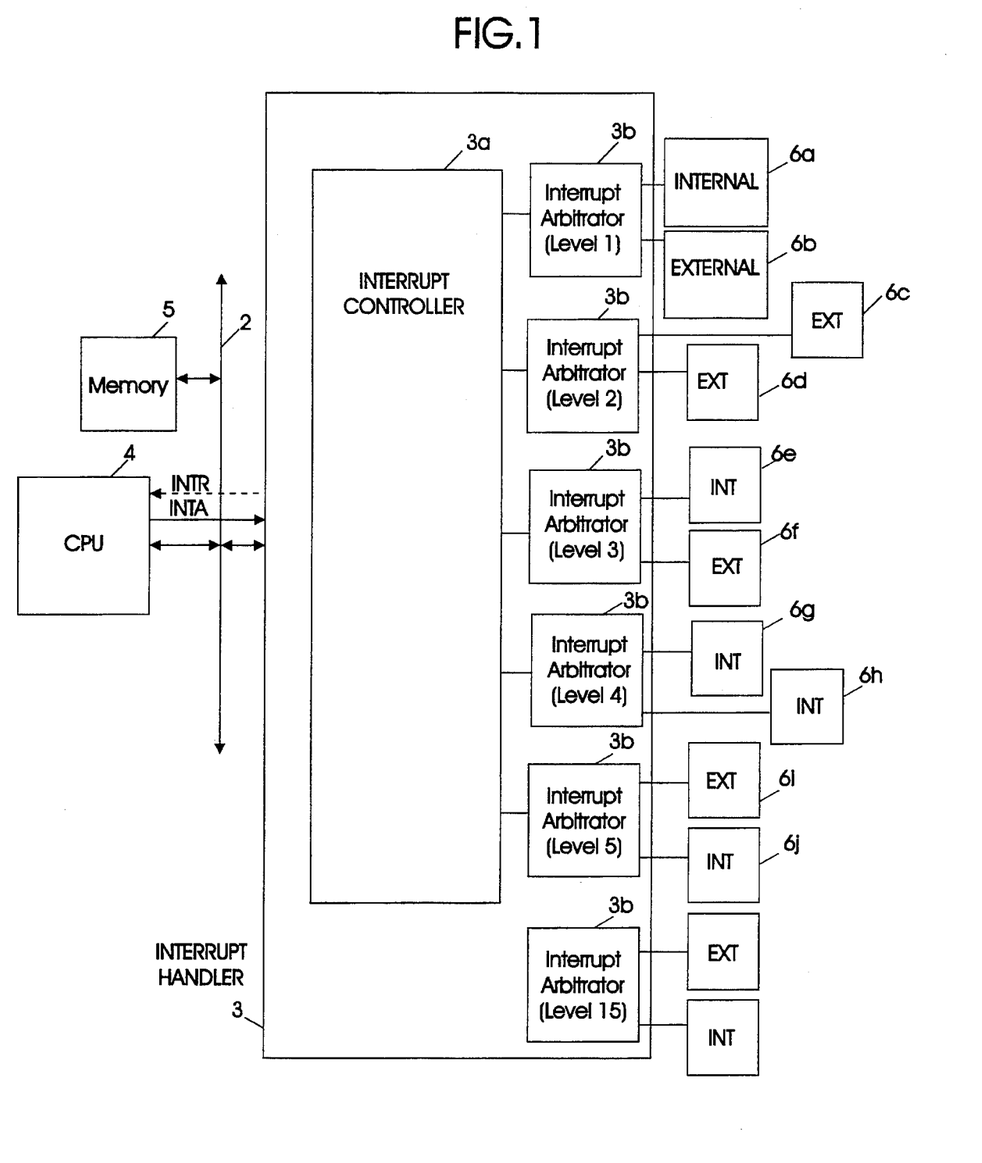
FIG. 1 is a block diagram of a computer system utilizing an interrupt controller in accordance with the invention for servicing peripheral devices.

Referring to FIG. 1, there is depicted a computer system employing an interrupt controller in accordance with the invention. A computer system bus 2 is connected to a central processing unit (CPU) 4, memory 5, and an interrupt handler 3. The interrupt handler 3 is connected to a plurality of peripheral devices 6a–6j which may be sensing or monitoring devices, such as thermocouples or voltage sensors, or control devices, such as motors, electronic switches, or other devices, suitable for computer controlled applications. In addition to being external peripheral devices the devices may also be internal devices. The devices 6a–6j have interrupt request outputs which are connected via lines to interrupt request inputs oh the interrupt handler 3. The interrupt handler 3 includes an interrupt request output connected via a line INTR to an interrupt request input on the CPU 4. An interrupt acknowledge line INTA is connected to carry an interrupt acknowledge signal from the CPU 4 back to the interrupt handler 3. The lines INTR, INTA are usually treated as part of a system bus including data, address, and control lines. For the purpose of illustration, however, FIG. 1 shows the interrupt request line INTR and the interrupt acknowledge line INTA running between the interrupt handler 3 and the CPU 4 as separate lines.

The internal devices that generate internal interruption requests are not necessarily discrete elements and can be a system timer, for example.

Preferred embodiments of present invention provide fifteen int/errupt priority levels. Within each interrupt priority level, two devices 6a–6j arbitrate for servicing of interrupts. The interrupt handler 3 therefore provides a plurality of interrupt controllers 3a and interrupt arbitrators 3b, one pair for each priority level. The interrupt controllers 3a, however, can also be integrated as one unit (shown in FIG. 1) coupled to the individual interrupt arbitrators 3b.

Figure 1A:
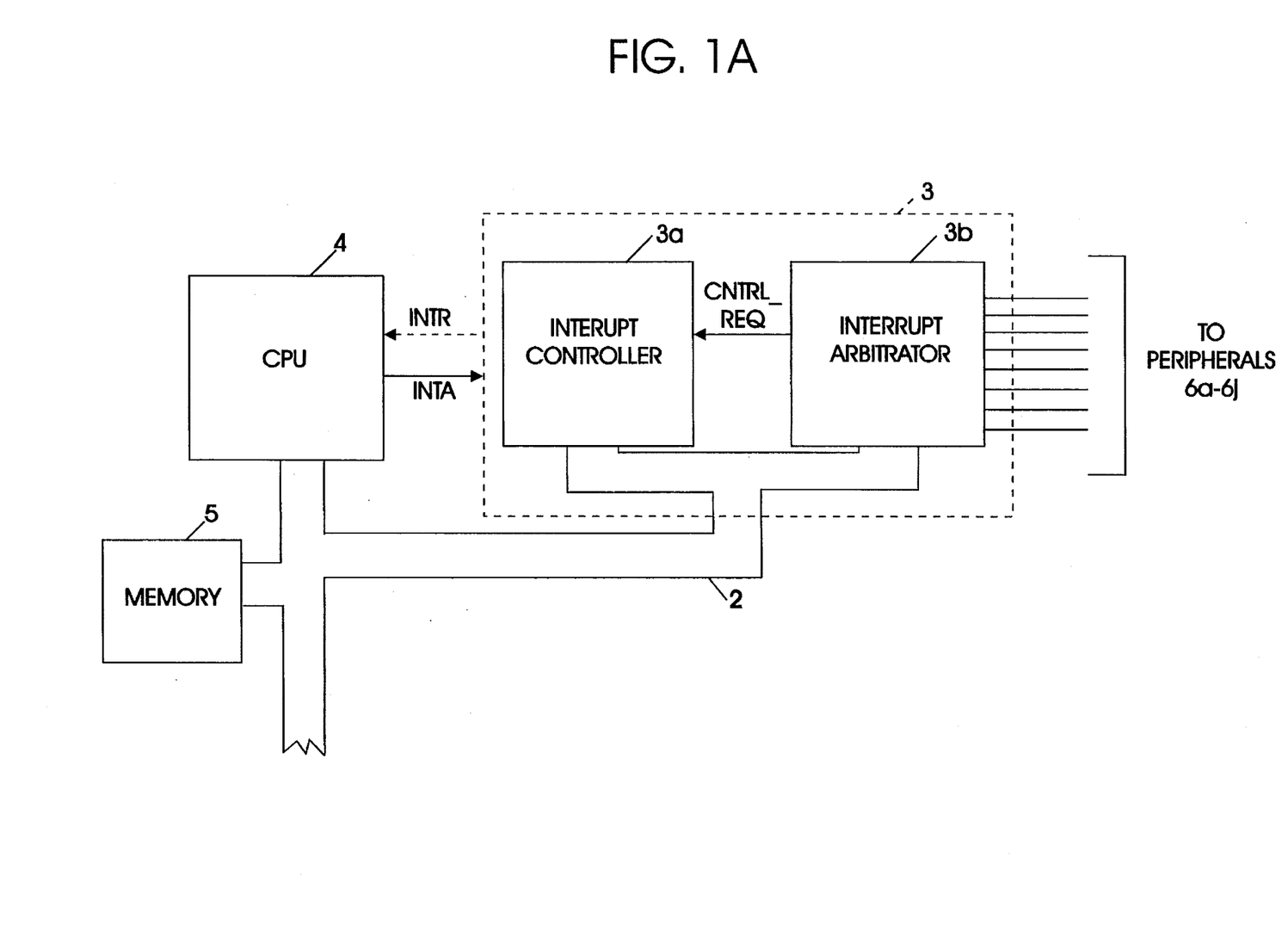
FIG. 1a shows a portion of the system of FIG. 1, illustrating in more detail the interrupt handler of the present invention.

The interrupt handler 3 for one priority level is illustrated in more detail in FIG. 1a, and includes the interrupt controller 3a and the interrupt arbitrator 3b. Both the interrupt controller 3a and the interrupt arbitrator 3b are coupled to the bus 2. The CPU 4 communicates with the interrupt controller 3a, which receives an interruption request signal (CNTRL_REQ) from the interrupt arbitrator 3b when a peripheral or internal device 6a–6j sends an interrupt request signal that wins arbitration. "Arbitration" is a method of selecting a device from among a plurality of contending devices for use of a common resource. The interrupt arbitrator 3b also receives signals from the bus 2 and the interrupt acknowledge signal (INTR_ACK) from the CPU 4.

Figures 2, 2B:
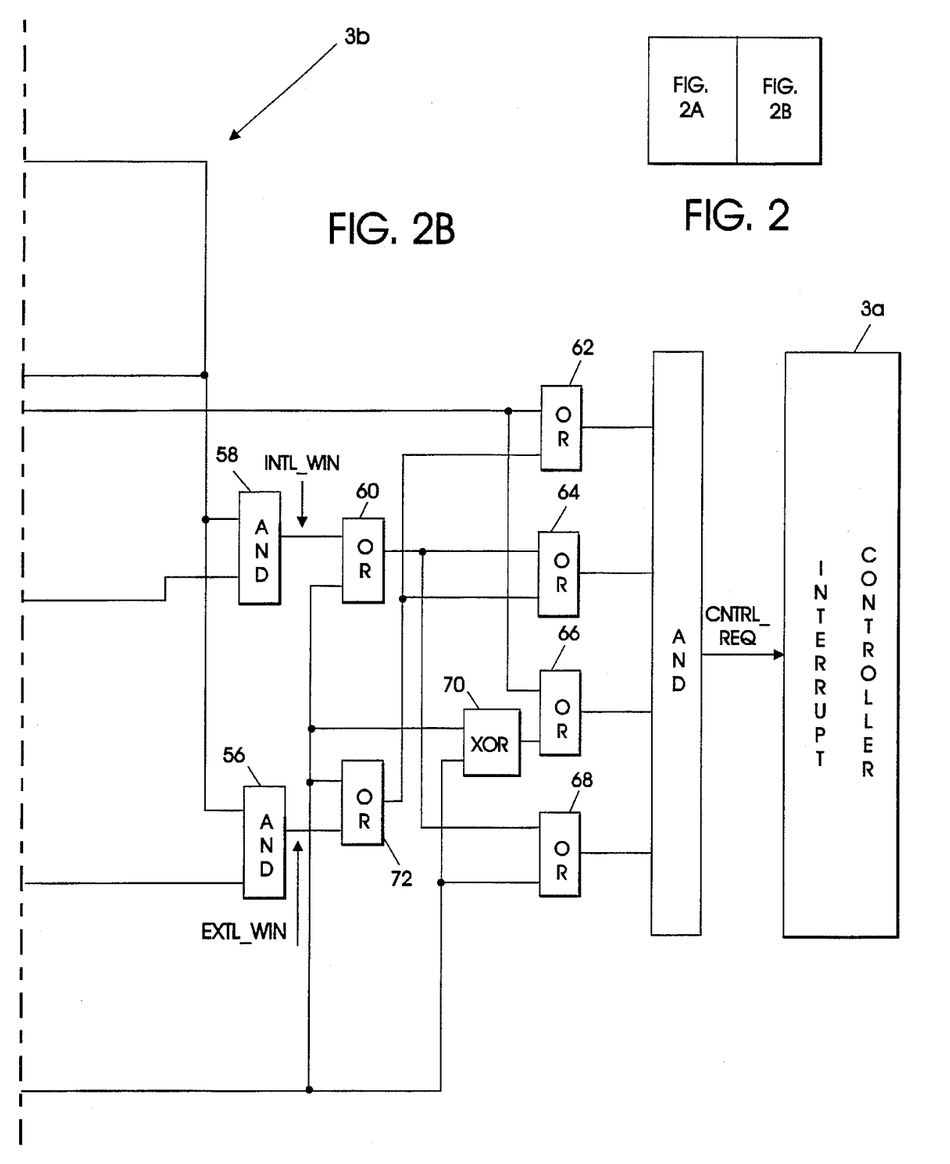
FIG. 2 illustrates an interrupt arbitrator constructed in accordance with an embodiment of the present invention.
Figure 2A:
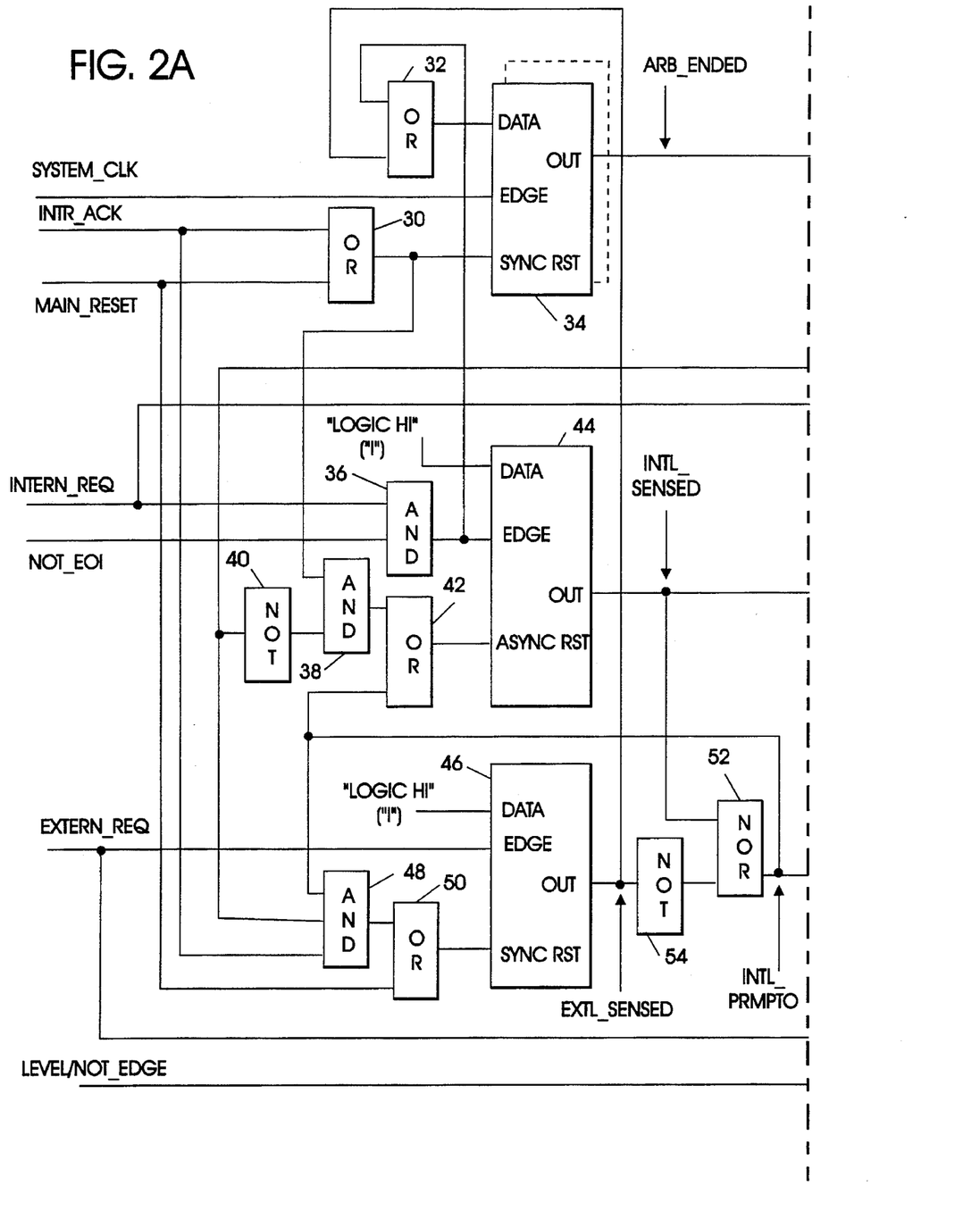
Figure 3:
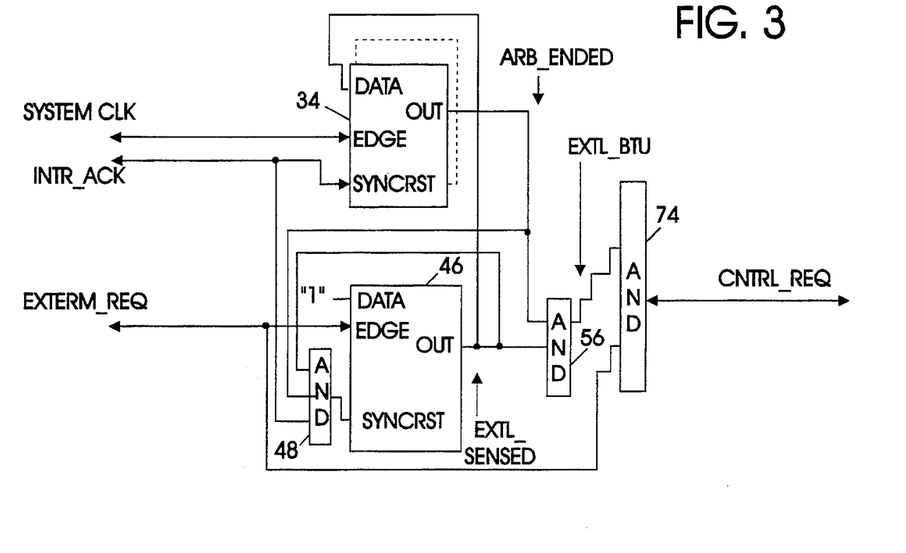
FIG. 3 shows only those devices of the interrupt handler from the embodiment of FIG. 2 that are active when there are no sensed internal request signals.
Figure 4:
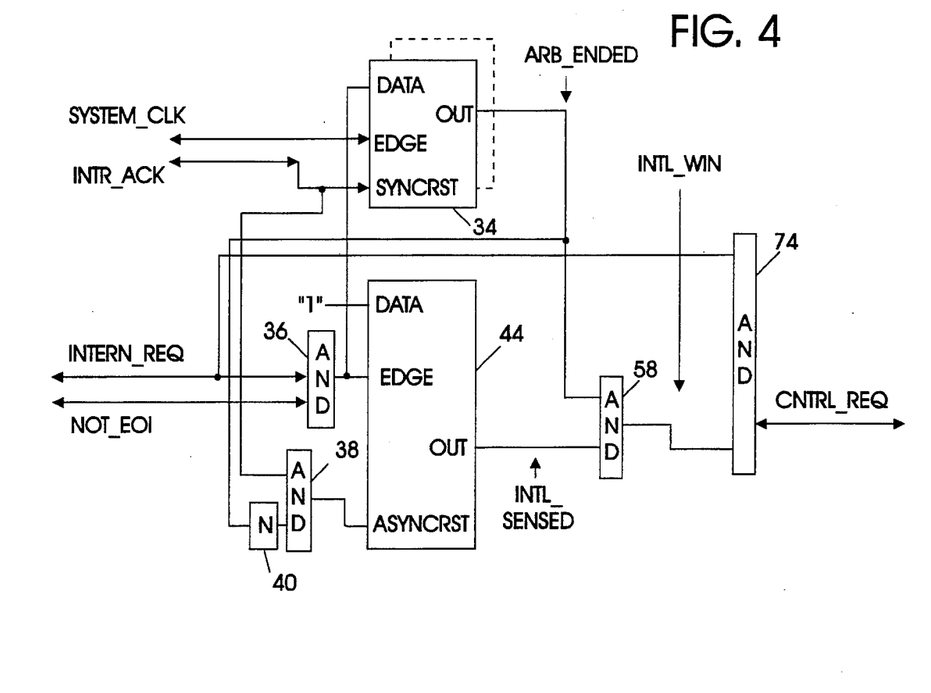
FIG. 4 shows only those devices of the interrupt handler from the embodiment of FIG. 2 that are active when there are no sensed external request signals.
Figure 5:
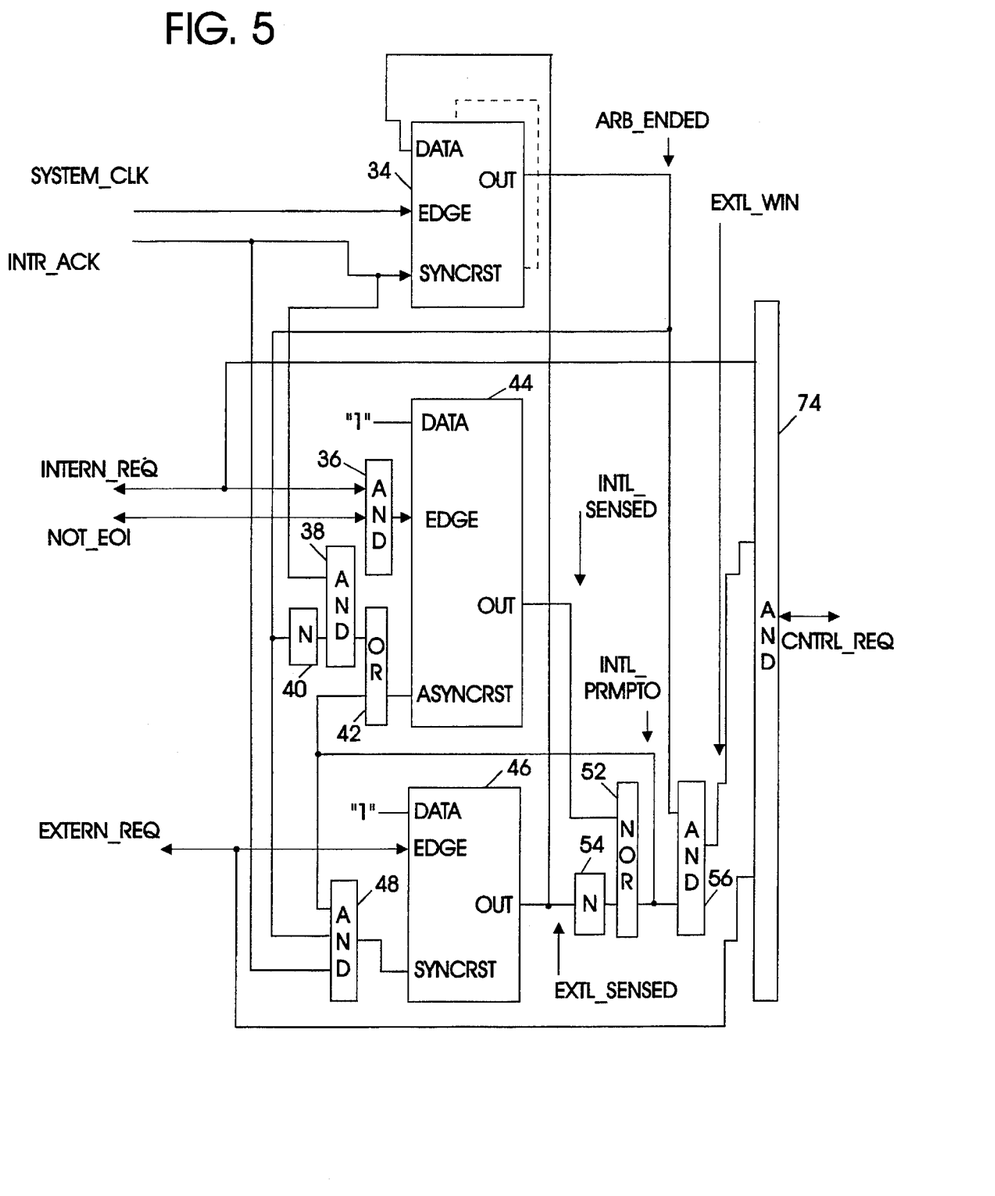
FIG. 5 shows only those devices of the interrupt handler from the embodiment of FIG. 2 that are active when an internal device has lost access arbitration.
Figure 6:
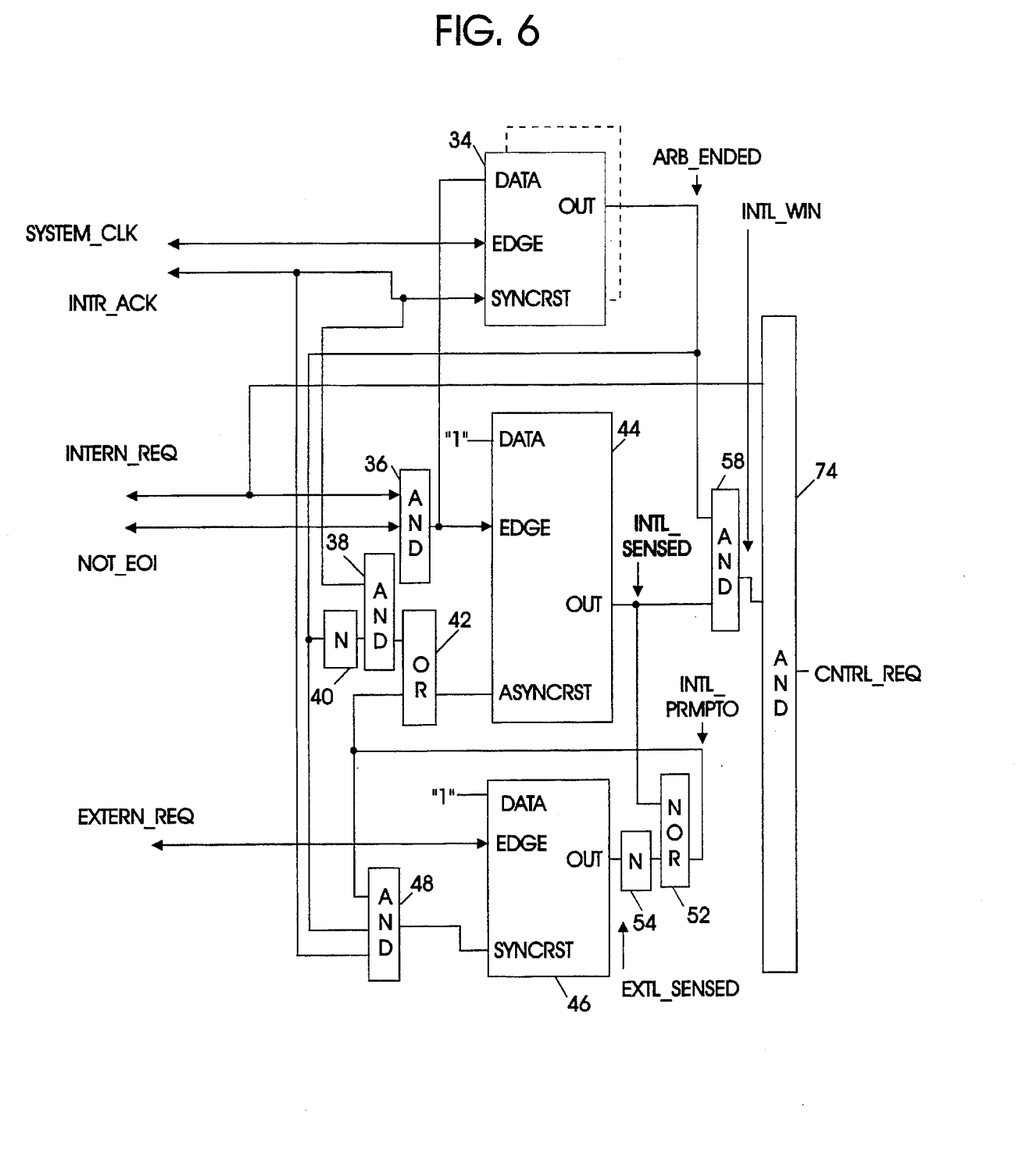
FIG. 6 shows only those devices of the interrupt handler from the embodiment of FIG. 2 that are active when an external device has lost access arbitration.

A more detailed circuit diagram of an exemplary embodiment of the interrupt arbitrator 3b of the present invention is shown in FIG. 2. The individual connections between the various elements comprising the interrupt arbitrator 3b are illustrated in FIG. 2 and will be discussed with respect to their activation under various circumstances.

The interrupt arbitrator 3b operates in two modes to accommodate three different types of interruptions. It is able to support those external peripheral devices that source rising edges on their interrupt request signals to ask for interruptions and then retain the resultant high polarities until the corresponding acknowledgments arrive. These signals are external edge-triggered interrupt request signals. The interrupt arbitrator will also support those external devices that force low polarity levels on their request outputs to solicit interruptions and then retain these low levels until their requests are acknowledged. These signals are external level-triggered interrupt request signals. The interrupt arbitrator will further support those internal devices that force high polarity levels on their request outputs to solicit interruptions and then retain these high levels until their requests are acknowledged. The internal interrupt request signals are always level active and assert with high polarities. These signals are internal level-triggered interrupt request signals.

When the interrupt arbitrator 3b operates in a "level mode" receiving external level interrupt requests, the LEVEL/NOT_EDGE input is sustained at a high polarity by a signal from the bus 2. In this level mode all the devices in FIG. 2 deactivate with the exception of Exclusive-OR (XOR) gate 70, OR gate 66 and AND gate 74. The XOR gate 70 inverts the incoming external level-triggered interrupt requests thereby enabling the OR gate 66 to combine these inverted requests with their internal level-triggered equivalents. The AND gate 74 always sources a request input of the associated interrupt controller 3a regardless of the mode of operation of the interrupt arbitrator 3b and drives the request input to a high polarity to convey need for interruption. In the level mode, the AND gate 74 seeks to induce interruptions when either an external or an internal interrupt request asserts and seeks to avoid interruptions when both requests deactivate.

The remaining circuitry of the interrupt arbitrator 3b is used when the arbitrator is to operate in an "edge mode" which allows the receipt of both edge-triggered interrupt request signals from an external device and level-triggered interrupt request signals from an internal device, with both types of interrupt request signals having identical priority. In this mode, when receiving external edge requests, the LEVEL/NOT_EDGE input is retained at a low polarity. As a result, OR gates 60 and 72 and XOR gate 70 deactivate and behave as non-inverting buffers.

In the edge mode, the circuit of the interrupt arbitrator 3b can be considered as dividing into four main functional sections. The first functional section detects and records incoming request assertions and includes AND gate 36 and latches 44 and 46. The latch 46 senses the rising edges constituting external edge-triggered interrupt request signals and sets high its EXTL_SENSED output to indicate their arrival. Likewise, the latch 44 detects the rising edges initiating the high assertions constituting internal level-triggered interrupt request signals and latches a high polarity at its INTL_SENSED output to indicate their receipt. The AND gate 36 enables internal level re-interruptions if requests remain asserted past the end of a next end-of-interrupt (EOI) command by allowing the rising edges of the resultant EOI pulses to reach and set latch 44.

A second functional section implements an arbitration scheme that enables contending requestors to interrupt by gaining alternate access to the output of the interrupt arbitrator 3b. This section includes OR gate 32 and 42, latches 34 and 44, NOT gate 54, NOR gate 52, and AND gates 56 and 58. For proper operation of the interrupt arbitrator 3b, all inputs are expected to receive signals that arrive synchronized with the system clock (SYSTEM_CLK) except for the external request input (EXTERN_REQ) which must latch a corresponding high polarity immediately after its incoming signal asserts. The OR gate 32 triggers the start of an arbitration interval after receiving either a high polarity resulting from the rising edge assertion of an external request or the high polarity constituting the level assertion of an internal request. The latch 34 times the duration of the arbitration interval and signals its completion by asserting its ARB_ENDED output. The duration of arbitration is dependent on the number of latches contained within the latch 34. Though the latch 34 is shown as a single latch, it is preferable if two latches are used to minimize the effects of the metastability that can result when attempting to synchronize the asynchronous latched external edge-triggered interrupt request signals. If the latch 34 contains two latches then it is unnecessary to double latch within the interrupt controller 3a the CNTRL_REQ signal sourced by the output of the interrupt arbitrator 3b.

The unclocked set-reset discrete latch formed by OR gate 42, latch 44, NOT gate 54 and NOR gate 52 provides the core mechanism on which access arbitration is based. Its fast asynchronous feedback permits logic to attain stability values promptly while its complementary operation permits it to retain a single necessary latched request asserted at the ends of arbitrations to seek interruptions. For proper circuit operation it is important that the maximum cumulative path delay accrued from appropriate contributions by elements 42, 44, 54 and 52 be smaller than the minimum duration of the arbitration interval. Signals INTL_WIN and EXTL_WIN are deasserted during arbitration and isolated by latch 34 output ARB_ENDED from the transitions then present in the preceding logic. In addition, signals INTL_WIN and EXTL_WIN never assert jointly no prevent glitches at the circuit output and to ensure proper granting to the winning device of access to the interrupt arbitrator 3b output. An asserted INTL_WIN signal at the end of arbitration indicates that the internal device won the arbitration; similarly, an asserted signal EXTL_WIN identifies the external device as the winner of the arbitration.

The third functional section funnels to the interrupt controller 3a the polarity of the winning request once access arbitration completes. This section includes OR gates 62, 64, 66 and 68, and AND gate 74. These elements comprise a two-to-one multiplexer that uses a boolean product-of-sums implementation to reduce device complexity. The OR gate 64 deasserts the output of the arbitrator 3b when the EXTL_WIN and INTL_WIN signals are inactive meaning that neither the internal nor the external device owns access to the output. The OR gate 62 permits the incoming internal polarities to source the output when the internal device owns access to the output and the related signal EXTL_WIN which maintains opposite assertion deactivates. Likewise, the OR gate 68 permits the incoming external polarities to source the output when the external device owns access to the output and the related signal INTL_WIN which maintains opposite assertion deactivates. The OR gate 66 contributes combinational logic redundancy to eliminate the boolean hazards and minimize the glitches that result when both incoming requests toggle jointly.

The fourth and last functional section resets the interrupt arbitrator 3b to prepare it for subsequent requests for interruption without erasing record of any pending or unserviced requests. This section includes NOT gate 40, OR gate 30, 42 and 50, and AND gates 38, 48. The OR gate 50 allows the MAIN_RESET input to initialize latch 46 shortly after powerup; likewise, the OR gate 30 permits the latch 34 to attain a defined state soon after MAIN_RESET asserts. Additionally, the OR gate 30 enables the acknowledge pulse sourced by the INTR_ACK input to reset unconditionally the latch 34 clearing its ARB_ENDED output a cycle after the arrival of the pulse. The INTR_ACK input expects a single high active pulse lasting for a minimum of two cycles to arrive in response to a request for interruption.

The NOT gate 40 prevents input INTR_ACK from clearing the latch 44 before ARB_ENDED deasserts; it also permits INTR_ACK to initialize latch 44 clearing its INTL_SENSED output via the OR gate 30, AND gate 38 and OR gate 42 after ARB_ENDED deasserts. Conversely, the AND gate 48 prevents INTR_ACK from continuing to clear latch 46 after ARB_ENDED deasserts. The AND gate 48 also enables INTR_ACK to initialize latch 46 clearing its EXTL_SENSED output via AND gate 48 and OR gate 50 before ARB_ENDED deasserts but only if the INTL_PRMPTD signal is asserted indicating that the external device won the previous arbitration and originated the request being acknowledged. A deasserted INTL_PRMPTD signal could result from either an asserted INTL_SENSED signal or from deassertions on both the INTL_SENSED and EXTL_SENSED latch outputs; the former case indicates that the internal device won the previous arbitration while the latter means that neither device sought interruption. The INTR_ACK input will not reset latch 46 when the INTL_PRMPTD signal is deasserted since the external device does not originate a request in either scenario cited and resetting of latch 46 could erase the record of a pending external request.

A pending external request is flagged when both latch outputs EXTL_SENSED and INTL_SENSED remain asserted past the end of arbitration. A pending request could result from the receipt of an incoming external request that becomes detected but not before access to the output is granted to an earlier uncontested internal request. Alternatively, it might derive from the receipt of an incoming external interrupt request signal that becomes detected and which competes with an incoming internal interrupt request signal but loses the arbitration. In either case, the external device gains access to the output after winning unconditionally the next arbitration. The latch 44 must await the resetting of the latch 34 before becoming cleared in order to prevent a pending request at signal EXTL_SENSED from clearing itself. If latch INTL_SENSED clears, deasserting its sink at NOR gate 52 and thereby permitting latch EXTL_SENSED to assert the sink of signal INTL_PRMPTD at AND gate 48 before the ARB_ENDED latch is able to deassert its own sink there, then the assertion on input INTR_ACK could propagate through AND gate 48 and OR gate 50 to reset latch 46 and erase its pending request.

An external edge-triggered device notifies of its need for interruption only once by generating an edge on its request output; as a result the latched record of an external request stored in latch 46 and sourced by the signal EXTL_SENSED can only be cleared by a corresponding acknowledgement to avoid its loss. Conversely, an internal device does not notify of its need for interruption only once but continues to indicate its need by retaining its requesting level asserted until the request is acknowledged. As a result, the latched record of an internal interrupt request stored in latch 44 and sourced by signal INTL_SENSED does not have to be exclusively reset by a corresponding acknowledgement to avoid its loss since it can be duly regenerated from the continuously asserted request.

The operation of the interrupt handler 3 in edge mode (with the interrupt controller 3a and the interrupt arbitrator 3b) will be described with respect to FIGS. 3–14. Of these, FIGS. 3–6 illustrate those elements of the interrupt arbitrator 3b that are active in the different discussed scenarios, the other elements being present but not having a role in the described scenario.

FIGS. 7–14 are diagrams illustrating signals to show the operation of the present invention in different scenarios. Undefined states are shown as X's. External requests are assumed to be low active polarity signals during level operation. Internal requests are assumed to be high active polarity inputs. INTR_ACK is a high active polarity input and is expected to receive a single acknowledge pulse. Input NOT_EOI is assumed to maintain a quiescent high polarity. Output CNTRL_REQ is assumed to assert to a high polarity in all scenarios. The latch 34 and the latch 46 clear synchronously whereas latch 44 clears asynchronously. Synchronous effects are shown in timing diagrams using square zig-zagged arrows resembling oscilloscope waveforms of signal clock periods; asynchronous effects are shown using straight arrows. Rising edge triggering is shown in the timing diagrams through the use of horizontal arrowtails; polarity triggering is depicted using vertical arrowtails. Dashed lines adjoining events indicate indirect triggering.

Figure 7:
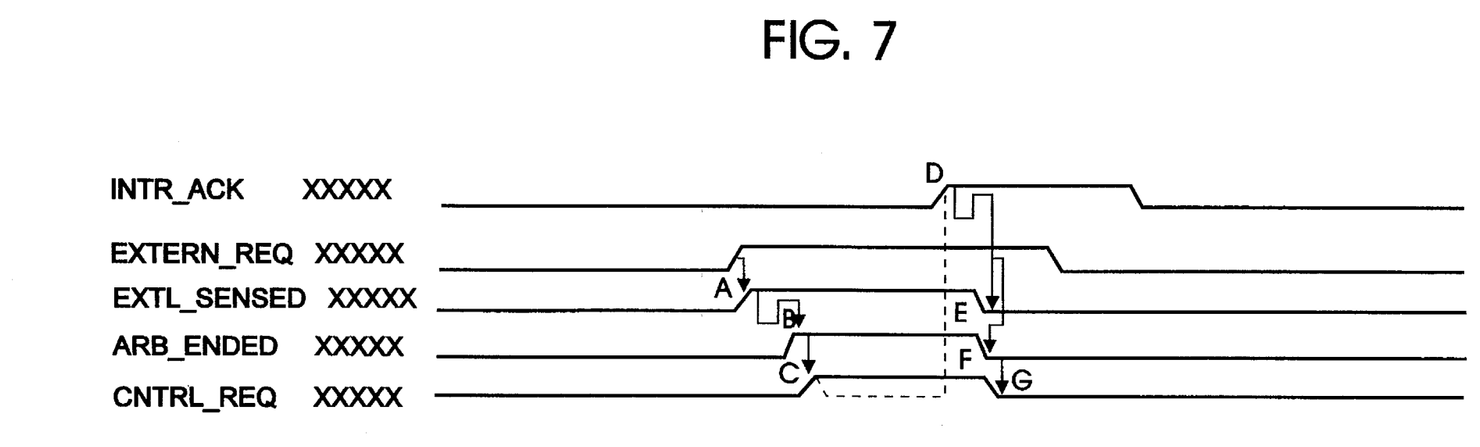
FIG. 7 is a timing diagram illustrating a first scenario in which a valid external edge request signal interrupts in the absence of internal request signals.

In the first scenario, there is a valid external edge request that interrupts in the absence of internal requests. In this scenario, the INTERN_REQ input remains inactive. Since no internal requests are sensed, the INTL_SENSED latch does not set and the circuit of FIG. 2 reduces to the schematic shown in FIG. 3. The circuit attains defined values after becoming initialized by the MASTER_RESET input. The rising edge on the EXTERN_REQ input sets the EXTL_SENSED latch at event A to indicate receipt of an external request. The ARB_ENDED signal asserts at event B since the external device wins any access arbitration against an inactive internal device. The external device then gains access to the output and sends out its incoming request asserting the CNTRL_REQ output at event C. This asserted output is routed through the interrupt controller 3a to the processor (CPU) 4 that interprets the assertion as a request for interruption and responds by generating an interrupt acknowledge cycle at event D. The controller 3a notices a high polarity on its CNTRL_REQ input at the time its acknowledge input is asserted by the processor 4 and considers the interruption valid. The high polarity of the acknowledge pulse clears the EXTL_SENSED latch at event E because this latch detected the request being acknowledged; it also clears the ARB_ENDED latch at event F. This resetting of the ARB_ENDED latch deasserts the CNTRL_REQ output at event G.

Figure 8:
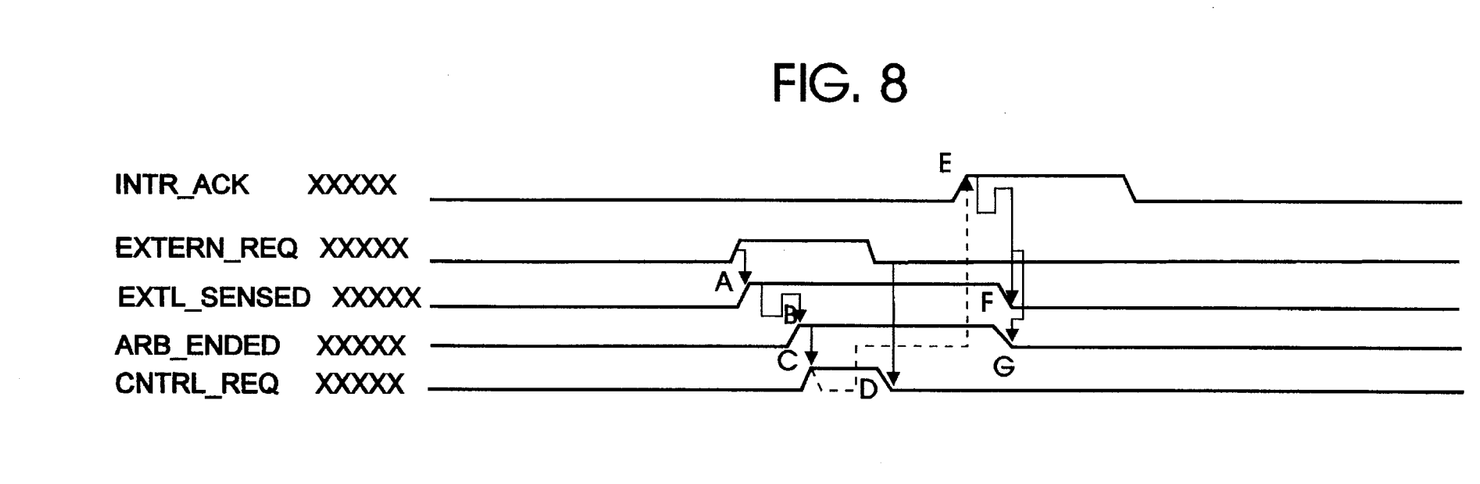
FIG. 8 is a timing diagram illustrating a second scenario in which a spurious external edge request signal interrupts in the absence of internal request signals.

In the second timing scenario, a spurious external edge request interrupts in the absence of internal requests. In this scenario, the INTERN_REQ input remains inactive since no internal requests are sensed. The INTL_SENSED latch does not set and the circuit of FIG. 2 reduces to the schematic shown in FIG. 3. The circuit attains defined values after becoming initialized by the MASTER_RESET input. The rising edge on the EXTERN_REQ input sets the EXTL_SENSED latch at event A to indicate receipt of an external request. The ARB_ENDED signal asserts at event B since the external device wins any access arbitration against an inactive internal device. The external device gains access to the output and sends out its incoming request asserting the CNTRL_REQ output at event C. This asserted output is routed through the interrupt controller 3a to the processor 4 that interprets the assertion as a request for interruption and later responds by generating an interrupt acknowledge cycle. Meanwhile, the external device stops sourcing a high polarity on its request output; this polarity removal deasserts the CNTRL_REQ output at event D. The processor 4 eventually responds to the original request generating an interrupt acknowledge cycle at event E. The controller 3a does not notice a high polarity on its CNTRL_REQ input at the time its acknowledge input is asserted by the processor 4 and considers the interruption spurious. The high polarity of the acknowledge pulse clears the EXTL_SENSED latch at event F because this latch detected the request being acknowledged; it also clears the ARB_ENDED latch at event G.

Figure 9:
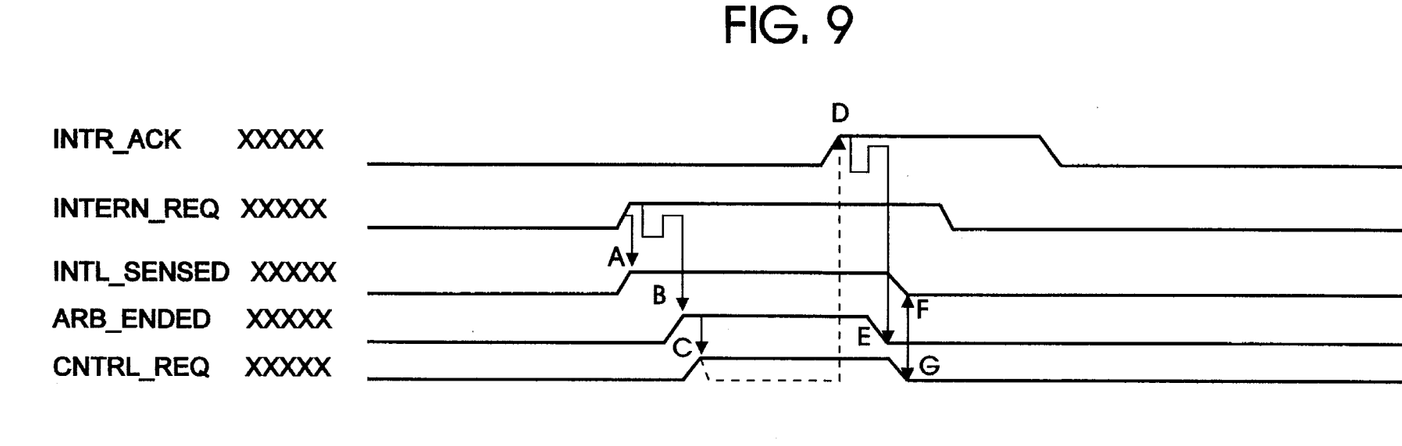
FIG. 9 is a timing diagram illustrating a third scenario in which a valid internal request signal interrupts in the absence of external request signals.

In the third timing scenario, there is a valid internal request that interrupts in the absence of external requests. The EXTERN_REQ input remains inactive during this scenario. Since no external requests are sensed, the EXTL_SENSED latch does not set and the circuit of FIG. 2 reduces to the schematic shown in FIG. 4. The circuit attains defined values after becoming initialized by the MASTER_RESET input. The rising edge initiating the level assertion of the INTERN_REQ input sets the INTL_SENSED latch at event A to indicate receipt of an internal request. The ARB_ENDED signal asserts at event B since the internal device wins any access arbitration against an inactive external device. The internal device gains access to the output and sends out its incoming request asserting the CNTRL_REQ output at event C. This asserted output is routed through the interrupt controller 3a to the processor 4 that interprets the assertion as a request for interruption and responds by generating an interrupt acknowledge cycle at event D. The controller 3a notices a high polarity on its CNTRL_REQ input at the time its acknowledge input is asserted by the processor 4 and considers the interruption valid. The high polarity of the acknowledge pulse clears the ARB_ENDED latch at event E; it also clears the INTL_SENSED latch at event F but only after the ARB_ENDED latch resets. The resetting of the ARB_ENDED latch deasserts the CNTRL_REQ output at event G.

Figure 10:
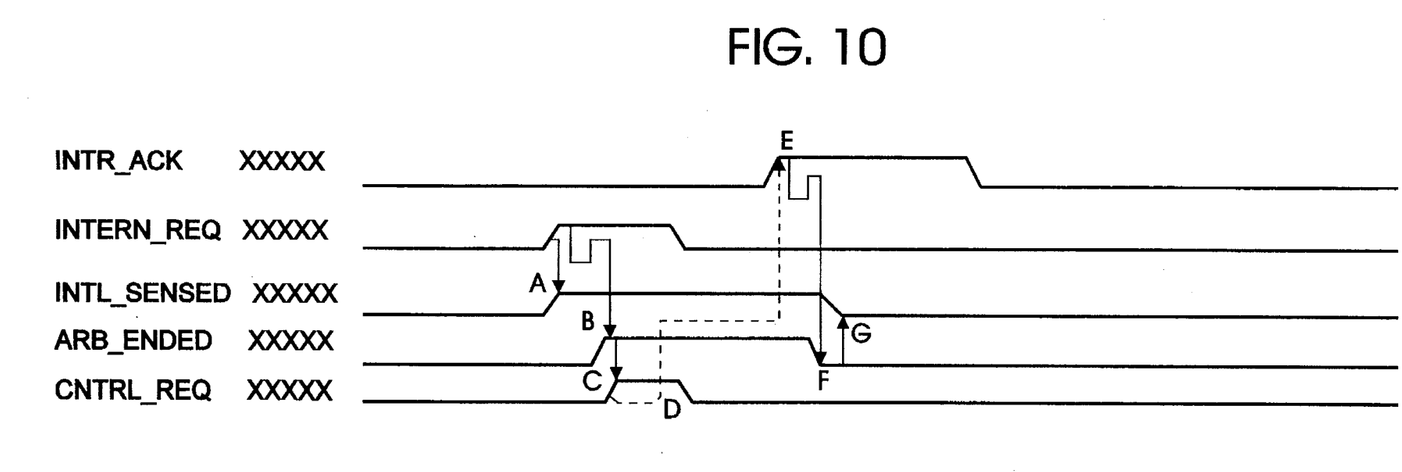
FIG. 10 is a timing diagram illustrating a fourth scenario in which a spurious internal request signal interrupts in the absence of external request signals.

In the fourth timing scenario, there is a spurious internal request interrupting in the absence of external requests. The EXTERN_REQ input remains inactive during this scenario. Since no external requests are sensed, the EXTL_SENSED latch does not set and the circuit of FIG. 2 reduces to the schematic shown in FIG. 4. The circuit attains defined values after becoming initialized by the MASTER_RESET input. The rising edge initiating the level assertion of the INTERN_REQ input sets the INTL_SENSED latch at event A to indicate receipt of an internal request. The ARB_ENDED signal asserts at event B since the internal device wins any access arbitration against an inactive external device. The internal device gains access to the output and sends out its incoming request asserting the CNTRL_REQ output at event C. This asserted output is routed through the interrupt controller 3a to the processor 4 that interprets the assertion as a request for interruption and later responds by generating an interrupt acknowledge cycle. Meanwhile, the internal device removes its request; this polarity removal deasserts the CNTRL_REQ output at event D. The processor 4 eventually responds to the original request generating an interrupt acknowledge cycle at event E. The controller 3a does not notice a high polarity on its CNTRL_REQ input at the time its acknowledge input is asserted by the processor and considers the interruption spurious. The high polarity of the acknowledge pulse clears the ARB_ENDED latch at event F; it also clears the INTL_SENSED latch at event G but only after the ARB_ENDED latch resets.

Figure 11:
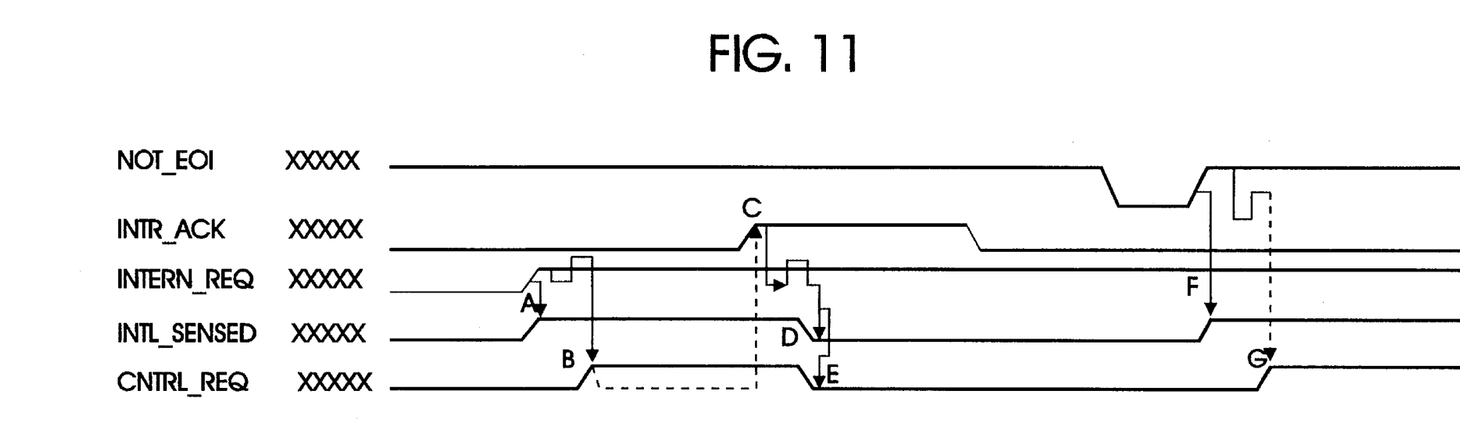
FIG. 11 is a timing diagram illustrating a fifth scenario in which a valid internal request signal re-interrupts in the absence of external request signals.

In a fifth scenario, there is a valid internal request re-interrupting in the absence of external requests. In this scenario, the EXTERN_REQ input remains inactive. Since no external requests are sensed, the EXTL_SENSED latch does not set and the circuit of FIG. 2 reduces to the schematic shown in FIG. 4. The circuit attains defined values after becoming initialized by the MASTER_RESET input. The rising edge initiating the level assertion of the INTERN_REQ input sets the INTL_SENSED latch at event A to indicate receipt of an internal request. The internal device wins arbitration since the external device is inactive, gains access to the output and sends out its incoming internal request asserting the CNTRL_REQ output at event B. This asserted output is routed through the interrupt controller 3a to the processor 4 that interprets the assertion as a request for interruption and responds by generating an interrupt acknowledge cycle at event C. The controller 3a notices a high polarity on its CNTRL_REQ input at the time its acknowledge input is asserted by the processor 4 and considers the interruption valid. The high polarity of the acknowledge pulse clears the INTL_SENSED latch at event D and deasserts the CNTRL_REQ output at event E. Subsequently, the asserted INTERN_REQ input permits the trailing edge of the end-of-interrupt pulse to set the INTL_SENSED latch at event F to indicate receipt of another request for interruption. The internal device wins the arbitration against the inactive external device and regains access to the output. Then, to signal re-interruption, the internal device sends out once more its incoming request reasserting the CNTRL_REQ output at event G. The interrupt controller 3a notices the assertion of the CNTRL_REQ output after the end-of-interrupt pulse deasserts and interprets the high polarity of the assertion as a request for re-interruption.

Figure 12:
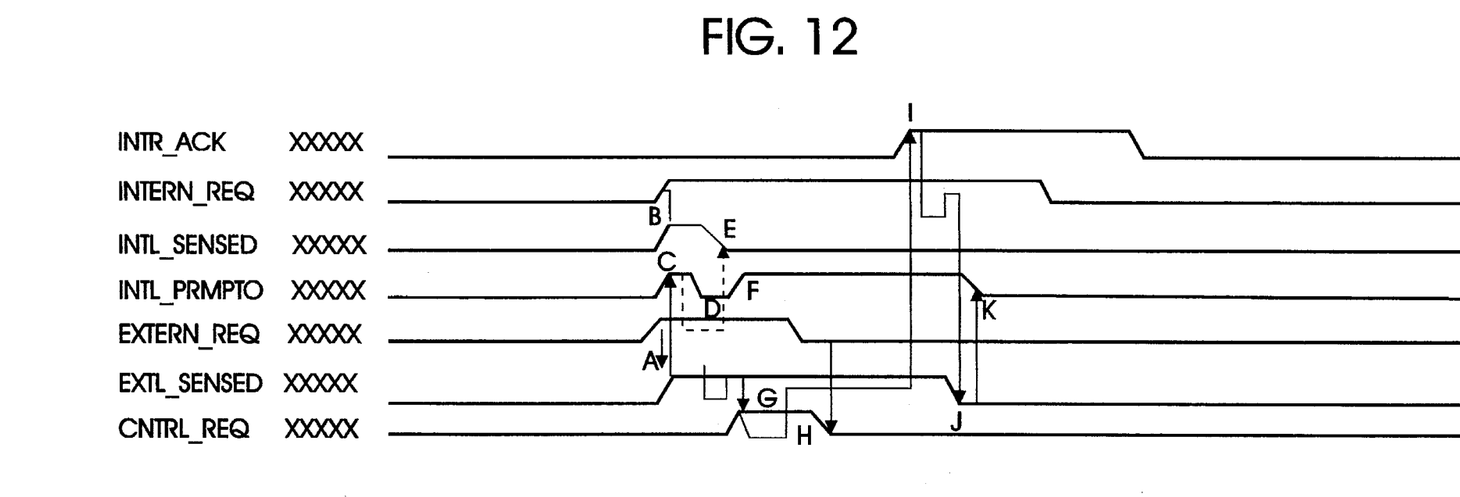
FIG. 12 is a timing diagram illustrating a sixth scenario in which a spurious external edge request signal preempts a valid internal request signal and interrupts.

In a sixth scenario, there is a spurious external edge request near the end of a prior cycle preempting a valid internal request and interrupting. Both the internal and the external requests activate in this scenario. Since the internal request fails to win access to the output, the INTL_WiN signal does not assert and the circuit of FIG. 2 reduces to the schematic shown in FIG. 5. The circuit attains defined values after becoming initialized by the MASTER_RESET input. The edge assertion of the EXTERN_REQ input sets the EXTL_SENSED latch at event A to indicate receipt of an external request; likewise, the rising edge initiating the level assertion of input INTERN_REQ sets the INTL_SENSED latch at event B to flag receipt of an internal request. Both latched requests arbitrate to gain access to the output. The latched external request attempts to win the arbitration by trying to clear the latched internal request while asserting the INTL_PRMPTD signal at event C. The latched internal request attempts to win by trying to prevent its own clearance while deasserting the INTL_PRMPTD signal at event D. The resulting initial pulse shown on the INTL_PRMPTD signal lasts sufficiently and resets the INTL_SENSED latch at event E. The resetting of the INTL_SENSED latch permits the EXTL_SENSED latch to reassert the INTL_PRMPTD signal at event F. The external device gains access to the output at the end of arbitration; it then sends out its incoming request asserting the CNTRL_REQ output at event G. This asserted output is routed through the interrupt controller 3a to the processor 4 that interprets the assertion as a request for interruption and later responds by generating an interrupt acknowledge cycle. Meanwhile, the external device stops sourcing a high polarity to the external request input; this polarity removal deasserts the CNTRL_REQ output at event H. The processor 4 eventually responds to the original request generating an interrupt acknowledge cycle at event I. The controller 3a does not notice a high polarity on its CNTRL_REQ input at the time its acknowledge input is asserted by the processor 4 and considers the interruption spurious. The high polarity of the acknowledge pulse clears the EXTL_SENSED latch an event J because this latch detected the request being acknowledged. Resetting of the EXTL_SENSED latch deasserts the INTL_PRMPTD signal at event K.

Figure 13:
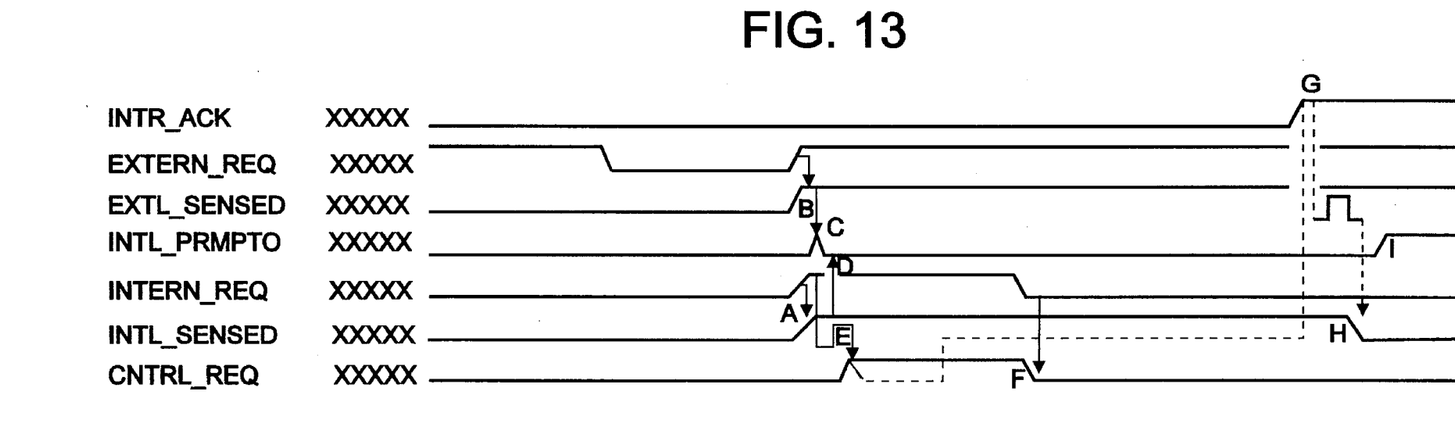
FIG. 13 is a timing diagram illustrating a seventh scenario in which a spurious internal request signal preempts a valid external edge request signal coincident in arrival and interrupts.

In the seventh scenario, there is a spurious internal request preempting a valid external edge request coincident in arrival and interrupting. In this scenario, both the internal and the external requests activate. Since the external request fails to gain access to the output, the EXTL_WIN signal does not assert and the circuit of FIG. 2 reduces to the schematic shown in FIG. 6. The circuit attains defined values after becoming initialized by the MASTER_RESET input. The rising edge initiating the level assertion of the INTERN_REQ input sets the INTL_SENSED latch at event A to indicate receipt of an internal request; likewise, the edge assertion of input EXTERN_REQ sets the EXTL_SENSED latch at event B to flag receipt of an external request. Both latched requests arbitrate to gain access to the output. The latched external request attempts to win the arbitration by trying to clear the latched internal request while asserting the INTL_PRMPTD signal at event C; the latched internal request attempts to win by trying to prevent its own clearance while deasserting the INTL_PRMPTD signal at event D. The resulting glitch shown in the INTL_PRMPTD signal does not last sufficiently and fails to reset the INTL_SENSED latch. The internal device gains access to the output at the end of arbitration; it then sends out its incoming request asserting the CNTRL_REQ output at event E. This asserted output is routed through the interrupt controller 3a to the processor 4 that interprets the assertion as a request for interruption and later responds by generating an interrupt acknowledge cycle. Meanwhile, the internal device removes its request; this polarity- removal deasserts the CNTRL_REQ output at event F. The processor 4 responds to the original request generating an interrupt acknowledge cycle at event G. The controller 3a does not notice a high polarity on its CNTRL_REQ input at the time its acknowledge input is asserted by the processor 4 and considers the interruption spurious. The high polarity of the acknowledge pulse clears the INTL_SENSED latch at event H; however, it does not clear the EXTL_SENSED latch because this latch did not detect the request being acknowledged.

Figure 14:
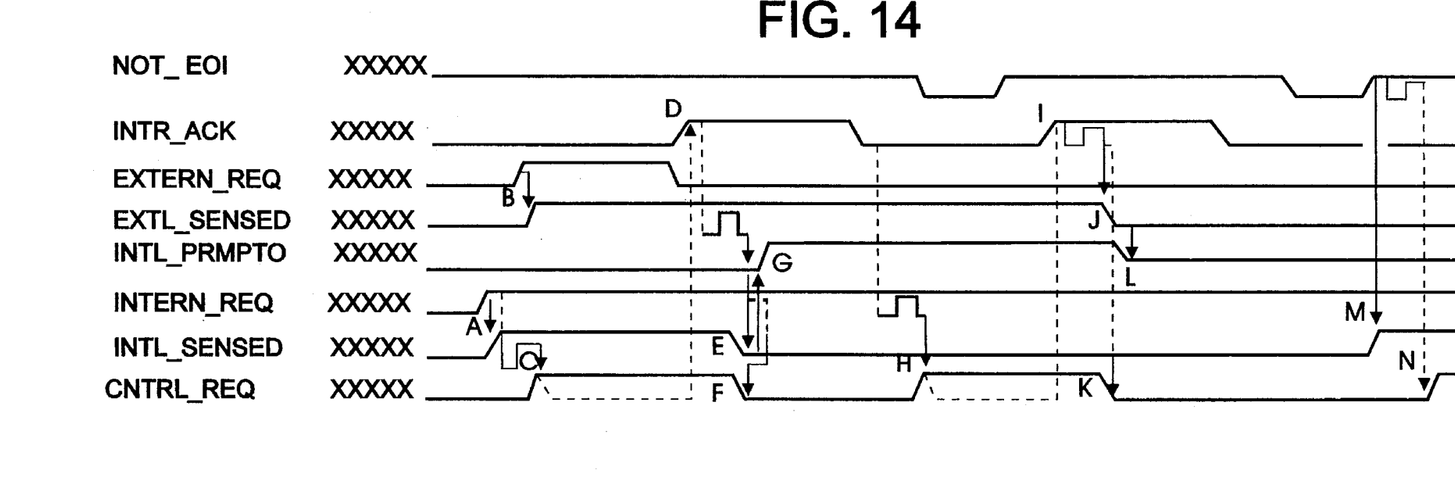
FIG. 14 is a timing diagram illustrating an eighth scenario in which a pending external edge request signal interrupts after preempting an internal re-interruption request in the prior cycle.

In the eighth scenario, there is a pending external edge request interrupting after preempting an internal re-interruption request in the prior cycle. Both the internal and the external requests activate in this scenario. Since both requests alternately win access to the output, all devices and paths in FIG. 2 activate. The circuit attains defined values after becoming initialized by the MASTER_RESET input. The rising edge initiating the level assertion of the INTERN_REQ input sets the INTL_SENSED latch at event A to indicate receipt of an internal request. Likewise, the edge assertion of the EXTERN_REQ input sets the EXTL_SENSED latch at event B to flag receipt of an external request. The setting of the INTL_SENSED latch deasserts signal INTL_PRMPTD before the setting of the EXTL_SENSED latch is able to assert the same signals. Consequently, the internal device wins arbitration; it then gains access to the output and sends out its incoming request asserting the CNTRL_REQ output at event C. This asserted output is routed through the interrupt controller 3a to the processor 4 that interprets the assertion as a request for interruption and responds by generating an interrupt acknowledge cycle at event D. The controller 3a notices a high polarity on its CNTRL_REQ input at the time its acknowledge input is asserted by the processor 4 and considers the interruption valid. The high polarity of the acknowledge pulse clears the INTL_SENSED latch at event E and deasserts the CNTRL_REQ output at event F; however, it does not clear the EXTL_SENSED latch because this latch did not detect the request being acknowledged. The resetting of the INTL_SENSED latch permits the asserted EXTL_SENSED latch to disable the sensing of the incoming internal requests while retaining latch INTL_SENSED reset by asserting the INTL_PRMPTD signal at event G. Without internal device contention the external device wins the arbitration which begins once this acknowledge cycle completes. The external device then gains access to the output and sends out its incoming request reasserting the CNTRL_REQ output at event H. This asserted output is routed through the interrupt controller 3a to the processor 4 which interprets the assertion as a request for interruption and responds by generating an interrupt acknowledge cycle at event i. The controller 3a does not notice a high polarity on its CNTRL_REQ input at the time its acknowledge input is asserted by the processor 4 and considers the interruption spurious. The high polarity of the acknowledge pulse clears the EXTL_SENSED latch at event J because this latch detected the request being acknowledged; it also deasserts the CNTRL_REQ output at event K. The resetting of the EXTL_SENSED latch reenables the sensing of the incoming internal requests by deasserting the INTL_PRMPTD signal at event L. Subsequently, the asserted INTERN_REQ input permits the trailing edge of the end-of-interrupt pulse to set the INTL_SENSED latch at event M to indicate receipt of another request for interruption. The internal device wins the arbitration against the inactive external device and regains access to the output; then to signal re-interruption, it sends out once more its incoming request reasserting the CNTRL_REQ output at event N. The interrupt controller 3a notices the assertion of the CNTRL_REQ output after the end-of-interrupt pulse deasserts and interprets the high polarity of the assertion as a request for re-interruption.

As these different scenarios illustrate, in edge mode, the present invention latches the incoming edge and level requests separately and then arbitrates between the latched requests to determine the next device to seek interrupt service. The edge and level request signals have identical priority for purposes of arbitration.

The embodiment of the present invention described above is exemplary only, and other arrangements may be used without departing from the spirit and scope of the present invention. For example, other arrangements that cause the arbitrator 3b to sequence the signals in a different manner than that already described are readily achieved with the present invention. Some predetermined criteria that is decisive as to which interrupt wins arbitration can be, for example, which signal is received first. Alternatively, all edge signals can win the arbitration over level signals, or vice versa. In certain embodiments of the invention, the predetermined criteria is programmable to allow the user greater flexibility in optimizing the computer system.

Although the present invention has been described and illustrated in detail, it is clearly understood that the same is by way of illustration and example only and is not to be taken by way of limitation, the spirit and scope of the present invention being limited only by terms of the appended claims.

What is claimed is:

1. A computer system comprising:
 a processor having an interrupt request input, the processor servicing interrupts in response to receipt of a signal at the interrupt request input;
 a first device coupled to the processor, the first device capable of transmitting a first interrupt request signal that comprises an edge transition;
 a second device coupled to the processor, the second device capable of transmitting a second interrupt request signal that comprises a level assertion; and
 an interrupt handler coupled to the processor and the first and second devices, the interrupt handler receiving the first and second interrupt request signals as inputs and providing the first and second interrupt request signals as outputs to the processor in a sequence according to a predetermined criteria, the first and second interrupt request signals having identical priority.

2. The computer system of claim 1, wherein the interrupt handler includes an interrupt arbitrator having a first input for receiving the first interrupt request signals, a second input for receiving the second interrupt request signals, and an output for providing the first and second interrupt request signals in said sequence.

3. The computer system of claim 2, wherein the interrupt handler includes an interrupt controller having an input coupled to the output of the interrupt arbitrator, an output coupled to the interrupt request input of the processor, and an acknowledge input coupled to the processor to receive an interrupt acknowledge signal from the processor.

4. The computer system of claim 1, wherein the predetermined criteria is programmable.

5. The computer system of claim 1, wherein the predetermined criteria includes the sequence of receipt of the first and second interrupt request signals by the interrupt handler, the interrupt handler providing the first and second interrupt request signals to the processor in order of the sequence of receipt by the interrupt handler.

6. The computer system of claim 1, wherein the predetermined criteria includes whether the interrupt request signal is a first interrupt request signal comprising edge transitions or a second interrupt request signal comprising level assertions, the interrupt handler providing as an output an interrupt request signal that is a first interrupt request signal prior to an interrupt request signal that is a second interrupt request signal when both the first and second interrupt request signals are present at the interrupt handler.

7. The computer system of claim 1, wherein the predetermined criteria includes whether the interrupt request signal is a first interrupt request signal comprising edge transitions or a second interrupt request signal comprising level assertions, the interrupt handler providing as an output an interrupt request signal that is a second interrupt request signal prior to an interrupt request signal that is a first interrupt request signal when both the first and second interrupt request signals are present at the interrupt handler.

8. The computer system of claim 1, wherein the interrupt handler includes means for detecting and recording first and second interrupt request signals.

9. The computer system of claim 8, further comprising means for arbitrating among said first or second interrupt request signals to be provided as output by the interrupt handler.

10. The computer system of claim 9, further comprising means for generating in dependence on the arbitration the first or second interrupt signal as an output signal to the processor.

11. The computer system of claim 10, further comprising means for resetting the interrupt handler for receiving subsequent interrupt request signals after receiving a previous one of said interrupt request signals, and means for maintaining a record of said previous interrupt request signal.

12. The computer system of claim 1, wherein the interrupt handler includes means for converting the level assertions into edge transitions by sampling polarities of the second interrupt request signals at a completion of an end-of-interrupt command.

13. The computer system of claim 1, wherein the interrupt handler includes means for latching the first and second interrupt request signals separately and arbitrating between the first and second interrupt signals to determine the next device to seek interrupt service from the processor.

14. The computer system of claim 1, wherein the interrupt handler includes an access means for providing the first device with access to the processor, after assertion of the first interrupt request signal during a re-interruption by the second interrupt request signal, within servicing of the second interrupt request signal.

15. The computer system of claim 1, wherein the interrupt handler includes means for unconditionally preempting reinterruptions by the second device to thereby provide the first device with access to the processor.

16. An interrupt handler comprising:
 a first input for receiving interrupt request signals of a first type comprising edge transitions;
 a second input for receiving interrupt request signals of a second type, the second type comprising level assertions, the first type and the second type of interrupt request signals having identical priorities;
 a circuit coupled to the first and second inputs and having an output, the circuit sequentially providing the interrupt request signals of the first and second type at the output according to predetermined criteria.

17. The interrupt handler of claim 16, wherein the predetermined criteria is programmable.

18. The interrupt handler of claim 16, wherein the predetermined criteria includes the sequence of receipt of the first and second type of interrupt request signals by the interrupt handler, the interrupt handler providing the first and second type of interrupt request signals to the processor in order of the sequence of receipt by the interrupt handler.

19. The interrupt handler of claim 16, wherein the predetermined criteria includes whether the interrupt request signal is a first type of interrupt request signal comprising edge transitions or a second type of interrupt request signal comprising level assertions, the interrupt handler providing as an output an interrupt request signal that is the first type of interrupt request signal prior to an interrupt request signal that is the second type of interrupt request signal when both the first and second interrupt request signals are present at the interrupt handler.

20. The interrupt handler of claim 16, wherein the predetermined criteria includes whether the interrupt request signal is the first type of interrupt request signal comprising edge transitions or the second type of interrupt request signal comprising level assertions, the interrupt handler providing as an output an interrupt request signal that is the second interrupt request signal prior to an interrupt request signal that is the first interrupt request signal when both the first and second types of interrupt request signals are present at the interrupt handler.

21. The interrupt handler of claim 16, wherein the interrupt handler includes means for detecting and recording first and second types of interrupt request signals.

22. The interrupt handler of claim 21, further comprising means for arbitrating among received interrupt request signals to be provided as output from the interrupt handler.

23. The interrupt handler of claim 22, further comprising means for generating in dependence on the arbitration the first or second type of interrupt signal as an output signal to a processor.

24. The interrupt handler of claim 23, further comprising means for resetting the interrupt handler for receiving subsequent interrupt request signals after receiving a previous one of said interrupt request signals, and means for maintaining a record of said previous interrupt request signal.

25. A method of handling interrupt requests to a processor from a plurality of sources, the method comprising the steps:
 receiving in an interrupt handler a first interrupt request signal from at least one of said sources, the first interrupt request signal being an edge triggered request signal;
 receiving in the interrupt handler a second interrupt request signal from at least another one of said sources, the second interrupt request signal being a level triggered request signal, the first and second interrupt request signals having identical priority;
 providing as an output from the interrupt handler to a processor the first and second interrupt request signals in a sequence according to a predetermined criteria.

26. The method of claim 25, further comprising programming the interrupt handler with the predetermined criteria.

27. The method of claim 26, wherein the step of providing includes arbitrating among the received first and second interrupt request signals to be provided as output from the interrupt handler.

28. The method of claim 27, wherein the step of providing includes generating in dependence on the arbitration the first or second interrupt signal as an output signal to a processor.

29. The method of claim 28, further comprising the steps of resetting the interrupt handler for receiving subsequent interrupt request signals after receiving a previous one of said interrupt request signals, and maintaining a record of said previous interrupt request signal.

30. The method of claim 25, wherein the predetermined criteria includes the sequence of receipt of the first and second interrupt request signals by the interrupt handler, the interrupt handler providing the first and second interrupt request signals to the processor in order of the sequence of receipt by the interrupt handler.

31. The method of claim 25, wherein the predetermined criteria includes whether the interrupt request signal is an edge triggered request signal or a level triggered request signal the interrupt handler providing as an output the first interrupt request signal prior to the second interrupt request signal when both the first and second interrupt request signals are present at the interrupt handler.

32. The method of claim 25, wherein the predetermined criteria includes whether the interrupt request signal is an edge triggered request signal or a level triggered request signal, the interrupt handler providing as an output the second interrupt request signal prior to the first interrupt request signal when both the first and second interrupt request signals are present at the interrupt handler.

33. The method of claim 25, wherein the steps of receiving the first and second interrupt request signals includes means of recording the first and second interrupt request signals.

\* \* \* \* \*